(No Model.)
H. J. WOLTERS.
MEANS FOR AND METHOD OF RACKING FINE BEER.
No. 516,324. Patented Mar. 13, 1894.
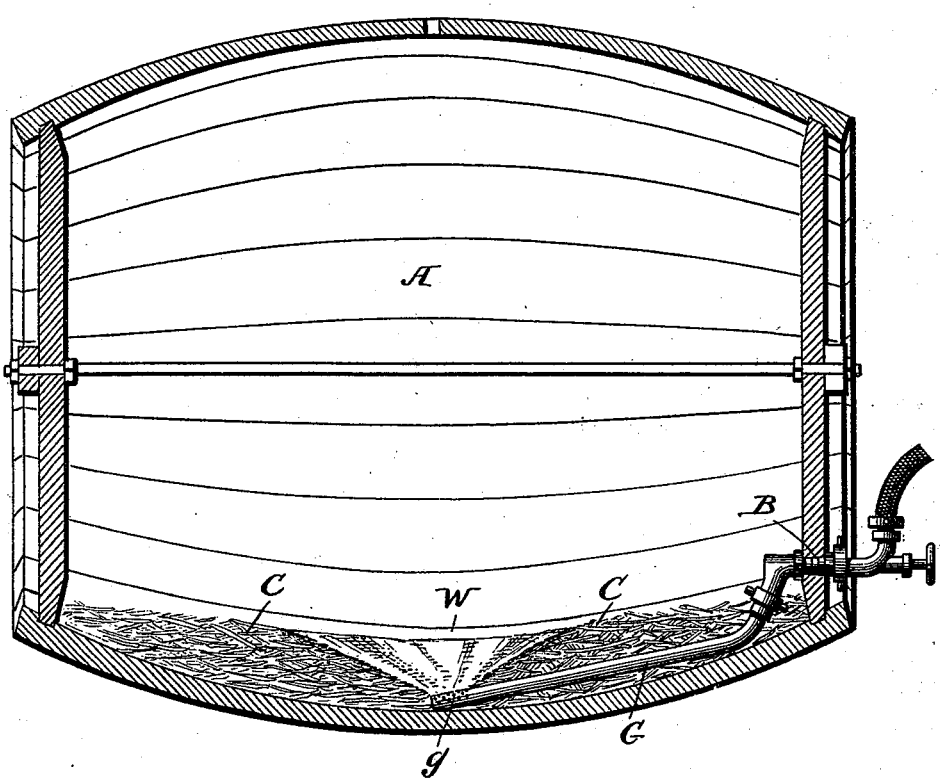

United States Patent Office.

HENRY JOSEPH WOLTERS, OF YORK, PENNSYLVANIA, ASSIGNOR TO THE ROCHESTER BUNGING APPARATUS COMPANY, OF ROCHESTER, NEW YORK.

MEANS FOR AND METHOD OF RACKING FINE BEER.

SPECIFICATION forming part of Letters Patent No. 516,324, dated March 13, 1894.

Application filed August 18, 1893. Serial No. 483,479. (No model.)

*To all whom it may concern:*

Be it known that I, HENRY JOSEPH WOLTERS, a citizen of the United States, residing at York, in the county of York and State of Pennsylvania, have invented certain new and useful Improvements in Means for and Methods of Racking Fine Beer, of which the following is a specification.

My invention relates to an improved means and method of racking fine beer, and it has for its object to provide a means and method whereby all the beer in the cask can be racked fine, without sediment, and it consists in the means and method substantially as hereinafter more particularly pointed out.

Referring to the accompanying drawing, I have shown a sectional view of one form of a chip cask provided with one form of mechanism or devices whereby my invention may be carried out, this being shown simply as illustrative, the invention not being limited, of course, to any particular means or apparatus.

In the process of making beer, it is well known that in one of the steps of the process, the beer is supplied to what are known as "chip casks," in which the process of fining the beer is carried out. These casks are usually of large dimensions and holding a great quantity of beer, and the cask is supplied with a quantity of chips or shavings, which operate to remove the substances that make the beer feculent, and which clear the beer of the muddy particles, resulting from fermentation and still remaining in the beer, these particles being attracted to and held on the chips or shavings which are suitably prepared and which act mechanically to aid in rendering the beer clear and translucent. While the beer is in the chip cask, it is also common to put in what are called "fining" substances, such for instance, as isinglass, and which tend to more perfectly clear the beer or fine it, and which eventually settles to the bottom of the cask and attaches itself to the chips, which are in such a condition that they have a greater specific gravity than the beer, and lie loosely in the bottom of the cask. In racking the beer from these casks, it is essential that the chips should not be disturbed, so that the muddy particles or impurities adhering thereto will not become mixed with the beer to render it cloudy, or to change in the slightest degree the color or clearness of the beer, and heretofore, it has been customary to draw off or rack the beer under pressure, and to watch the process with great care, and as soon as the slightest disturbance of the impurities or deposited yeast and other sediment appears in the beer, to stop the process at once. Subsequently, this so-called "rest" beer may be drawn off with as little disturbance as practicable, but it produces an impure and inferior beer which sometimes can be employed for drinking purposes, but which often is used for other purposes, as distilling or making vinegar, or the like, and in this way, while not being entirely wasted, it causes a considerable loss to the brewer, as there is often a number of barrels even of this "rest" or inferior beer which cannot be properly racked off, and sold as fine or first-class beer.

It is the object of my present invention to provide a means and method whereby practically all of the beer in the chip casks can be racked or withdrawn as fine beer without sediment or discoloration, and thereby the output of a high grade of beer is increased, and I will now proceed to describe what I consider to be the best means and method of accomplishing this result.

In the drawing, A represents what may be termed the "cask," in which the beer is cleansed, fined, and when desired submitted to the process of "kräusening," and B represents the bung or outlet of the cask, while C represents the chips or shavings lying in the bottom of the cask, where they mechanically take up the impurities, such as yeast and other particles deposited in the fining process.

As above indicated, it is usual to draw the beer through the bung as carefully as possible, taking care not to disturb the deposit at the bottom of the cask below the bung, and as soon as the beer runs cloudy or colored, the operation is stopped, and the remaining beer is subsequently withdrawn as a secondary or impure product.

In carrying out my method, I withdraw the beer from or about the lowest portion of the cask, and in order to prevent the disturbance of the deposit on the chips or shavings, I provide what may be called a well or opening in the mass of chips directly over the point of withdrawing the beer. Thus, referring to the drawings, it will be seen that W, represents such a well or space or opening, where the chips or shavings are so deposited as to form a clear space directly above the point of withdrawal or outlet, and this well may be variously formed, as for instance, the chips can be pushed aside or arranged by any suitable device, as a rod or the like, so as to leave a clear space or well at the lowermost portion of the cask. The better way of forming this well, however, is by forcing the beer into the cask through the outlet at the lowermost point of the cask, and in the drawing I have shown a pipe G leading from the bung B to the central portion of the cask, and having a strainer $g$ at its free end, the pipe being bent or curved so that it will normally rest at or near the central portion of the side or belly of the cask, being surrounded by the chips. When the beer is forced into the cask through the perforations $g$, which are preferably in the upper side of the pipe only, it will automatically form a sort of well, forcing the chips away from the strainer and causing them to rest and remain in this position to receive the deposit, so that the fine beer will have a free passage to the strainer without danger of disturbing the deposits on the chips.

It is understood that when the beer is racked off, it is under pressure, and while in some instances, this can be successfully done by commencing with a comparatively low pressure and gradually increasing the pressure as the beer is discharged, I find that this has a tendency to disturb the deposits or impurities to a greater or less extent, and I, therefore, preferably put on the extreme pressure before commencing to rack or withdraw the beer, and I find that when this is done, practically all the beer in the cask can be withdrawn through the well and pipe, without in the least disturbing the impurities and injuring the fine beer, and I am thereby enabled to utilize practically all the beer in the cask as a first-class or high grade product, and this I accomplish by my improved method of forming what I term a well in the chips and drawing the beer from the bottom of the well at or near the lowest point of the cask.

While I have shown a preferred form of device for racking the fine beer, I do not specifically describe the construction thereof, nor claim the same, as this constitutes the subject-matter of my application, Serial No. 472,244, heretofore filed by me, and it will be understood that while this is a preferred form of apparatus for carrying out my method, it may be carried out by the use of any other apparatus or device, the essential features of my method consisting in forming a well in the chips or shavings at the bottom of the cask over the point at which the beer is withdrawn, so that practically all the fine beer in the cask can be withdrawn without disturbing the impurities deposited on the chips, in the process of fining.

While I have described my improved means and method as applied more particularly to racking fine beer, it is evident that the invention may be applied to other liquids where it is desired to withdraw the same from the casks in which they are stored without disturbing the sediment or impurities therein.

What I claim is—

1. The method substantially as hereinbefore set forth of racking fine beer from chip casks, which consists in forming a well in the chips and drawing the beer fine from the bottom of the well at or near the lowest point of the cask.

2. The method substantially as hereinbefore set forth of racking fine beer from chip casks, which consists in forming a well in the central portion of the chips over the point from which the beer is drawn and drawing the beer from the bottom of the well, without disturbing the sediment deposited on the chips.

3. The method substantially as hereinbefore set forth of racking fine beer from chip casks, which consists in forming a well in the chips by forcing the beer into the cask through the chips from a point at or near the bottom of the cask, and drawing the beer fine from the bottom of the well below the level of the sediment of the chips.

4. As a means for racking fine beer from chip casks, a cask, chips in the cask, a well formed in the chips and an outlet for the beer at or near the lowermost portion of the cask and opening into the well only, substantially as described.

In testimony whereof I have signed my name to this specification in the presence of two subscribing witnesses.

HENRY JOSEPH WOLTERS.

Witnesses:
FRANK GEISE,
JACOB E. WEAVER.